United States Patent Office 3,654,176
Patented Apr. 4, 1972

---

3,654,176
COMPOSITION AND PROCESS FOR MAKING STABLE AQUEOUS SOL OF SYNTHETIC SILICATE
Barbara Susan Neumann and Keith Geoffrey Sansom, Redhill, England, assignors to Laporte Industries Limited, London, England
No Drawing. Filed June 2, 1970, Ser. No. 42,860
Claims priority, application Great Britain, June 10, 1969, 29,216/69
Int. Cl. B01j 13/00
U.S. Cl. 252—313 R                          12 Claims

ABSTRACT OF THE DISCLOSURE

Compositions are described containing a synthetic silicate, having a structure similar to that of clay minerals of the smectite type, a peptizer and a small amount of a cation for which the ratio $Z/r^2$ is greater than $2.0 \times 10^{16}$ where Z is the valency of the cation and $r$ is its radius. The compositions may be formulated with water to give sols of improved stability against gelling.

---

We describe in our Belgian Pat. No. 703,698 synthetic silicates having a structure similar to that of clay minerals of the smectite type and having the general structural formula:

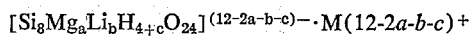
$$[Si_8Mg_aLi_bH_{4+c}O_{24}]^{(12-2a-b-c)-} \cdot M(12-2a-b-c)+$$

wherein M is a sodium or lithium cation or an equivalent of an organic cation; and the value of $a$, $b$ and $c$ is such that either $a<6$; $b>0$; $c>0$; $b+c<2$; and $$\pm(a+b+c-6)<2$$

or $a<6$; $b=0$; $\pm c<2$; and $\pm(a+c-6)<2$.

The synthetic silicates we describe therein are distinguished from natural hectorite and from synthetic silicates made by other processes for synthesising products having a structure similar to that of clay minerals of the smectite type in that when M is a sodium or lithium cation the products have a cation exchange capacity of about 50 to 120 meq./100 g., and a Bingham Yield Value of from about 40 to 250 dynes/cm.² as a 2% dispersion in tap water.

The relationships between $a$, $b$ and $c$ quoted above signify that in all cases the number of magnesium ions per unit cell of crystal is less than six and the total number of octahedral ions does not differ from six by more than two. If there is lithium present, the total number of hydrogen ions, including those normally assumed to be present as hydroxyl, is greater than or equal to four and the total number of octahedral ions other than magnesium is less than two. If lithium is absent, the total number of hydrogen ions may not differ from four by more than two.

Preferably if $b$ has a value greater than zero then it is from about 0.6 to 1.05. When $b$ is zero it is desirable that $a$ has a value from 4.5 to 5.9, preferably 5.0 to 5.8.

Examples of clay-like minerals of that invention are those in which sodium is the cation M and $a$ is 5.29, $b$ is 0.47 and $c$ is 0.49; or $a$ is 5.03, $b$ is 0.63 and $c$ is 0.78; or $a$ is 5.09; $b$ is zero and $c$ is 1.38; or $a$ is 5.38, $b$ is zero and $c$ is 0.78.

These new synthetic silicates, in which M is sodium or lithium, are obtained by coprecipitating from an aqueous solution which is maintained at pH 8 to 12.5 throughout and which contains a sodium compound, a water soluble magnesium salt, a silicon delivering material, for example a silicate, and optionally a lithium salt, each in calculated quantity to give the required values of $a$ and $c$ and then without first drying this coprecipitate heating it at a maximum temperature of less than 370° C. and a pressure of at least 7 kg./cm.², such that a liquid phase is present for a period of time, generally from 1 to 8 hours, to bring about crystal growth. The resultant solid and aqueous phases may then be separated and the product dried. Before or after drying the sodium cation may be replaced by lithium.

If these synthetic silicates, which we refer to below as synthetic clays, in which M is sodium or lithium, are dispersed in normal tap water at, for example, a solids concentration of 2% or more, a gel is obtained. For many purposes it is desirable that the clays should be capable of being formulated as sols which can subsequently be converted into gels. Accordingly we also described in that specification how the synthetic silicates could be formulated into a composition with up to 25% (by weight of the clay) of one or more peptisers. The inclusion of a peptiser in this way does promote the formation of a sol and it is generally possible to obtain sols that are fairly stable provided they contain less than about 5% of the clays. However if the sols contain more than this they are generally insufficiently stable with the result that they convert into gels on standing.

It has been our object to improve the stability of these sols and, in particular, to provide sols of improved stability containing more than 6% of the synthetic clay.

In general it would be expected that the inclusion of cation in sols would render them less stable and therefore more liable to convert into a gel or to flocculate. However we have surprsingly found that we can stabilise the sols by including particular cations in particular amounts.

According to the invention we formulate a composition comprising (1) a synthetic clay having the structural formula given above in which M is sodium or lithium and $a$, $b$ and $c$ are as defined above, and which has a cation exchange capacity of about 50 to 120 meq./100 g. and a Bingham Yield Value of from about 40 to 250 dynes/cm.² as a 2% dispersion in tap water (i.e. having a hardness of 140 p.p.m.) in the absence of a peptiser, (2) 3 to 25%, by weight of clay of one or more peptisers and (3) from 0.02 to 0.8 milliequivalent per gram of clay (me./g.) of a water soluble cation for which the ratio $Z/r^2$ is greater than $2.0 \times 10^{16}$ measured as unit charge/cm.². In this definition Z is the valency of the cation, whilst $r$ is its radius, being the computed value according to Pauling, "Nature of the Chemical Bond," Cornell Univ. Press.

The following table illustrates in the first section suitable cations, and in the second section unsuitable cations. "Effectiveness" means that the cation promotes useful sol stability at 10% solids content.

| Cation | $Z/r^2 (\times 10^{-16})$ | "Effectiveness" |
|---|---|---|
| H⁺ | Very large | Yes. |
| Li⁺ | 2.8 | Yes. |
| Mg²⁺ | 4.8 | Yes. |
| Ca²⁺ | 2.04 | Yes. |
| Cu²⁺ | 2.2 | Yes. |
| Zn²⁺ | 3.6 | Yes. |
| Al³⁺ | 12 | Yes. |
| NH₄⁺ | 0.50 | No. |
| Na⁺ | 1.1 | No. |
| K⁺ | 0.56 | No. |
| Cs⁺ | 0.35 | No. |
| Sr²⁺ | 1.6 | No. |
| Ba²⁺ | 1.1 | No. |

Thus suitable cations for use in the invention include H⁺, Li⁺, Mg²⁺, Ca²⁺, Cu²⁺, Zn²⁺ and Al³⁺.

This composition may contain or be substantially free of water. Thus a dry mix can be obtained of the clay peptiser and a salt of the required cation or these three ingredients may be combined initially in the presence of water. Aqueous compositions may be sols, generally having a solids content of less than 15%, by weight, or they may be more concentrated, being capable of being diluted to form flowable sols.

An indication of the rheological properties of an aqueous clay composition is given by the extrapolated shear stress (E.S.S.).

When an aqueous composition is a sol with Newtonian flow properties the flow curve is nearly a straight line starting from the origin. When it is a sol with pseudo-plastic properties, its flow curve initially is a curve that starts from the origin and is convex to the shear stress axis and become a straight line at high shear stress. The flow curve of a gel starts from some point other than the origin on the shear stress axis and is, initially, curved but again it becomes straight at high shear stress. The E.S.S. is the intercept on the shear stress axis of the extrapolation of the straight line portion of the curve.

It has been found empirically that above E.S.S. values of 600 dyne/cm.$^2$, the compositions do not flow readily, and we have used this value to distinguish sols from gels. Below E.S.S. values of 600, the dispersions flow under small stresses, e.g. from an inverted bottle. It is emphasised that, as these systems flow, there is no genuine yield value, even when there is a measured E.S.S. value.

The desired cation may be included in the composition as a separate ingredient, and this is generally preferred since it facilitates control of the amount of cation added. However some or all of it may be included with one of the other ingredients of the composition or sol. For example a peptiser which is a water soluble calcium salt may be used but if all the peptiser is formed of such a salt it will be found that the amount of calcium is out of the tolerated range, and so only a proportion of the total amount of peptiser required may be a calcium salt. In some instances some or all of the desired cation may be introduced in the synthetic clay itself, for example remaining in this as an impurity from the synthesis of the clay. All that matters is that the total amount of the defined cations in the final sol shall fall within the specified range.

A mixture of cations may be used, provided their total amount falls within a satisfactory range.

If less than 0.02 me./g. of the cation or cations is present in the sol little or no stabilisation of the sol is obtained. If more than 0.8 me./g. is present again little or no stabilisation is achieved and in addition to becoming more gel-like there may be a tendency for flocculation to occur. Generally it is preferred that there should be at least 0.04 or preferably 0.06 me./g. cation and a suitable upper limit is often 0.5 me./g. The optimum amount depends upon the particular cation being used. For $Ca^{++}$ the optimum is between 0.02 and 0.16 with most satisfactory results generally being obtained at 0.06 to 0.1 me./g. For $Mg^{++}$ the optimum is generally from 0.1 to 0.4 me./g. For $Cu^{++}$ the optimum is between 0.1 and 0.5 me./g., generally between 0.1 and 0.4. For $Zn^{++}$ the optimum is between 0.1 and 0.4 me./g. For $Al^{+++}$ it is between 0.02 and 0.1 me./g. For $H^+$ it is from 0.1 to 0.3 me./g. For $Li^+$ it is between 0.2 and 0.8 me./g.

Since calcium can be used in amounts as low as 0.02 me./g. it follows that it is possible to obtain stabilised sols by dispersing the silicate and peptiser in extremely hard tap water without making any further addition of cation. However usually for best results with calcium it is necessary to add further calcium to bring the amount up to 0.06 or preferably even 0.08 me./g.

Calcium, in fact, is not one of the best cations for use in the invention, partly because of its tendency to induce flocculation. However it does have one advantage in that a sol stabilised with calcium is more stable against boiling than sols stabilised with the other cations that may be used in the invention.

The most satisfactory cations are $Mg^{2+}$ and $Cu^{2+}$ since these seem to be capable of giving the most stable sols. $Zn^{2+}$ is also satisfactory. $Cu^{2+}$ gives sols that optically appear to be particularly clear.

In order to introduce the required cation into the sol any suitable water soluble compound may be employed. Examples are: $CaSO_4 \cdot 2H_2O$; $Ca(NO_3)_2 \cdot 3H_2O$;

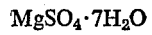
$MgSO_4 \cdot 7H_2O$ $CuSO_4 \cdot 5H_2O$; $ZnSO_4 \cdot 7H_2O$; $Li_2SO_4 \cdot H_2O$;

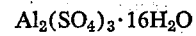
$Al_2(SO_4)_3 \cdot 16H_2O$

HCl aq.; but of course a wide variety of water soluble compounds can be used, including compounds similar to those listed above but having different degrees of hydration.

As peptiser can be used any suitable compound coming within the normally accepted meaning of the term, vide "An Introduction to Clay Colloid Chemistry," H. van Olphen, Interscience, New York, 1963, p. 109ff. Examples are water soluble salts having polyvalent anions, especially polyvalent anions capable of forming complex or insoluble salts with magnesium. In order for the salts to be water soluble they generally have to be alkali metal salts and preferably they are usually sodium salts. The anions are preferably polyphosphates. Tetrasodium pyrophosphate (Tetron) is a preferred material, others being sodium hexametaphosphate, such as the product sold under the trademark "Calgon," and sodium tripolyphosphate. The peptisers can also be organic materials but in general these tend to have a molecular weight that is rather too high for optimum results to be obtained.

The quantity of peptiser employed can be 3% to 25% (by weight of the clay), conveniently 3 to 15%, desirably from 5 to 10%, preferably 6% to 8%. These quantities are especially suitable when the peptiser is tetrasodium pyrophosphate.

Stabilised aqueous sols are prepared by adding to water one of the specified synthetic clays, preferably in an amount of from 5 to 15% and most preferably from 6 to 12%, in the presence of the peptiser and the desired cation in the desired amounts. This method can be effected, for example, by mixing the clay into water already containing the peptiser and cation, by diluting a gel or paste already containing the clay, peptiser and cation, or by mixing in a single operation the silicate, peptiser and cation yielding compound, with water. The silicate, peptiser and cation yielding compound may have been premixed by a dry mixing step. Another method is by mixing the clay and peptiser and adding this mixture to water containing the desired cation.

The total solids content of the sol (synthetic clay, cation-yielding compound and peptiser) can be up to 20%, but normally 5% to 12%, conveniently 8% to 10%, is employed.

The stabilised sols have a number of commercial applications. Thus they may be used in emulsion paint media, for example, in vinyl acetate copolymer aqueous emulsions. Due to the inclusion of the cation the sols can more easily be incorporated into the emulsion paint but the gelling performance of the clay in the paint is not detrimentally affected. After addition of the sol the paint gels. This seems to be because the other materials that are necessarily present in the paint, such as the copolymer emulsion and pigment, overcome the peptising effect of the peptiser on mixing the sol with them.

Another use of the stabilised sols is as an agent for the controlled coacervation of rubber latex. It has substantial advantages over the material normally used for this purpose, namely sodium silicofluoride, in that its action is independent of temperature and it is not toxic or corrosive.

The following are some examples of the invention. In each of these the stability of the sol was determined by measuring the E.S.S. in dynes/cm.$^2$ at various times after forming the initial aqueous composition. In most instances it can be considered that a sol is present when the E.S.S.

value is less than about 600. Distilled water was used in all cases except where otherwise specified.

Example 1

A synthetic silicate having the formula:

$$[Si_8Mg_{5.03}Li_{0.63}H_{4.78}O_{24}]^{0.53-}-Na^+_{0.53}$$

was prepared by the method of Example 2 in our Belgian Pat. No. 703,698 and, in its preparation, had been washed substantially free of soluble salts. In this clay $a=0.53$, $b=0.63$ and $c=0.78$ referring to the structural formula given above. It was dry blended with 6% by weight tetrasodium pyrophosphate and the dry mixture was added to distilled water in which had been dissolved varying amounts of various cation providing materials. The materials, all of laboratory reagent grade were $$Ca(NO_3)_2.3H_2O$$

$MgSO_4.7H_2O$, $CuSO_4.5H_2O$, $ZnSO_4.7H_2O$, $BaCl_2.2H_2O$, $Sr(NO_2)_2$, $LiSO_4H_2O$, $Na_2SO_4$, $K_2SO_4(NH_4)_2SO_4$, $Cs_2SO_4$, $Al_2(SO_4)_3.16H_2O$, HCl. In each instance the total solids concentration of the resultant mixture was 10% by weight. The mixture was formed at ambient temperature and subjected to high speed stirring for 15 minutes. The resultant product was allowed to stand for up to 72 hours or more. The properties of the resultant compositions were determined and are set out in Table 1.

TABLE 1

| Added cation | Amount, me./g. | 1 hour ESS dynes/cm.² | 24 hours ESS dynes/cm.² | 72 hours ESS dynes cm.² |
|---|---|---|---|---|
| | 0 | 480 | 1,515 | 1,770 |
| Ca²⁺ | 0.02 | 316 | 1,194 | 1,566 |
| Ca²⁺ | 0.04 | 278 | 606 | 1,187 |
| Ca²⁺ | 0.08 | 189 | 265 | 631 |
| Ca²⁺ | 0.16 | 259 | 441 | 676 |
| H⁺ | 0.1 | 380 | 1,200 | |
| H⁺ | 0.2 | 400 | 600 | |
| H⁺ | 0.3 | 420 | 400 | |
| Li⁺ | 0.1 | 400 | 1,400 | |
| Li⁺ | 0.5 | 100 | 320 | |
| Li⁺ | 0.8 | 230 | 400 | |
| Mg⁺⁺ | 0.05 | 350 | 1,300 | |
| Mg⁺⁺ | 0.16 | 200 | 380 | |
| Mg⁺⁺ | 0.32 | 150 | 170 | |
| Mg⁺⁺ | 0.5 | 450 | 1,100 | |
| Cu²⁺ | 0.05 | 350 | | 1,500 |
| Cu⁺⁺ | 0.2 | 200 | | 750 |
| Cu⁺⁺ | 0.32 | 170 | | 200 |
| Cu⁺⁺ | 0.5 | 250 | | 200 |
| Zn⁺⁺ | 0.04 | 550 | 1,300 | |
| Zn⁺⁺ | 0.08 | 400 | 1,120 | |
| Zn⁺⁺ | 0.16 | 280 | 1,050 | |
| Zn⁺⁺ | 0.32 | | 620 | 1,000 |
| Al⁺⁺⁺ | 0.02 | 500 | 1,250 | |
| Al⁺⁺⁺ | 0.04 | 390 | 1,200 | |
| Al⁺⁺⁺ | 0.08 | 400 | 450 | |
| NH₄⁺ | 0.02 | 700 | 1,400 | |
| NH₄⁺ | 0.16 | 750 | 1,300 | |
| Na⁺ | 0.1 | 650 | 1,400 | |
| Na⁺ | 0.32 | 780 | 1,450 | |
| K⁺ | 0.08 | 760 | 1,300 | |
| K⁺ | 0.32 | 1,100 | 1,350 | |
| Cs⁺ | 0.02 | 850 | 1,400 | |
| Cs⁺ | 0.16 | 1,000 | 1,450 | |
| Sr⁺⁺ | 0.04 | 620 | 1,100 | |
| Sr⁺⁺ | 0.08 | 1,100 | 1,480 | |
| Ba⁺⁺ | 0.04 | 900 | 1,500 | |
| Ba⁺⁺ | 0.16 | 1,050 | 1,450 | |

EXAMPLE 2

Compositions were prepared in the same manner as described in Example 1 using varying amounts of magnesium or copper as the cation and varying amounts of tetrasodium-pyrophosphate (TSPP) as the peptiser. The results are shown in Table 2.

TABLE 2

| Standing time (Hours) | 4% TSPP | 6% TSPP | | | 8% TSPP | |
|---|---|---|---|---|---|---|
| | 0.16 Mg me./g. | 0.16 Mg me./g. | 0.32 Mg me./g. | 0.32 Cu me./g. | 0.32 Mg me./g. | 0.32 Cu me./g. |
| 1 | 276 | 215 | 150 | 170 | 144 | 131 |
| 24 | | 379 | 165 | 159 | 345 | 138 |
| 72 | 1,014 | 852 | 276 | 200 | | |
| 168 | 1,793 | 1,250 | 496 | 359 | 621 | 455 |
| 336 | | 1,379 | 910 | 621 | 786 | 807 |

EXAMPLE 3

The process of Example 1 was repeated, using Mg⁺⁺ as the cation but using, in place of the synthetic clay used in Example 1, a synthetic clay of the formula:

$$[Si_8Mg_{.5.09}H_{5.38}O_{24}]^{0.44-}-Na^+_{0.44}$$

obtained by Example 5 of the Belgian patent. In this, $a=5.09$, $b=0$, $c=1.38$. The results obtained were as follows:

| Standing time (in hours) | E.S.S. with Mg²⁺⁺ added in me./g. | | |
|---|---|---|---|
| | 0 | 0.04 | 0.32 |
| 1 | 138 | 103 | 200 |
| 24 | 276 | 172 | 331 |

EXAMPLE 4

Vinyl acetate copolymer emulsion paint was prepared in a conventional manner using as thickener the synthetic clay used in Example 1 with varying cation adidtions, all incorporated in the manner described in Example 1. In each instance the amount of tetrasodiumpyrophosphate was 6% and the sol added to the emulsion had a 10% solids content and was added in amounts of 0.2 and 0.4% by weight. The emulsion paint without any sol added to it had a penetration of 30. The penetration values of emulsion paints having varying sols containing varying amounts of cations was as follows:

| Cation me./g. | Penetration with sol addition (in grams per unit penetration) | |
|---|---|---|
| | 0.2% | 0.4% |
| 0.32 Li⁺ | 115 | 137 |
| 0.08 Ca⁺⁺ | 135 | 135 |
| 0.16 Mg⁺⁺ | 124 | 127 |
| 0.32 Mg⁺⁺ | 128 | 130 |
| 0.08 Al⁺⁺⁺ | 125 | 133 |
| 0 | 124 | 143 |

We claim:

1. A composition capable of forming a stable aqueous sol comprising (1) a synthetic silicate having a structure similar to that of clay minerals of the smectite type and having the general structural formula:

$$[Si_8Mg_aLi_bH_{4+c}O_{24}]^{(12-2a-b-c)-} \cdot M(12-2a-b-c)^+$$

wherein M is a sodium or lithium cation and the value of $a$, $b$ and $c$ is such that either $a<6$; $b>0$; $c>0$; and $b+c<2$; $\pm(a+b+c-6)<2$; or $a<6$; $b=0\pm c<2$; and $\pm(a+c-6)<2$, and a cation exchange capacity of about 50 to 120 meq./100 g. and a Bingham Yield Value of from about 40 to 250 dynes/cm.² as a 2% dispersion in tap water, (2) 3 to 25%, by weight of silicate of one or more peptisers and (3) from 0.02 to 0.8 milliequivalent per gram of the silicate of one or more cations for which the ratio $Z/r^2$ is greater than $2.0 \times 10^{16}$, where Z is the valency and $r$ the radius of the cation.

2. A composition according to claim 1 in which the amount of cation or cations is from 0.04 to 0.8 me./g.

3. A composition according to claim 1 in which the cation or cations are selected from the group consisting of Ca⁺⁺, Cu⁺⁺, Mg⁺⁺ and Zn⁺⁺.

4. A composition according to claim 3 containing from 0.04 to 0.1 me./g. Ca⁺⁺ or 0.1 to 0.4 me./g. Cu⁺⁺, Zn⁺⁺ or Mg⁺⁺.

5. A composition according to claim 1 containing from 5 to 10%, by weight of silicate, of the peptiser or peptisers.

6. A composition according to claim 1 in which the peptiser is an alkali metal salt having polyvalent anions.

7. A composition according to claim 6 in which the salt is a sodium polyphosphate.

8. A composition according to claim 7 in which the phosphate is tetrasodium pyrophosphate.

9. A composition according to claim 1 in the form of a dry powder.

10. A composition according to claim 1 additionally including water.

11. A composition according to claim 10 in the form of a sol having a solids content of 6 to 12% by weight.

12. A process for making an aqueous sol of less than 15% solids content comprising combining (1) a synthetic silicate having a structure similar to that of clay minerals of the smectite type and having the general structural formula:

$$[Si_8Mg_aLi_bH_{4+c}O_{24}]^{(12-2a-b-c)-} \cdot M(12-2a-b-c)+$$

wherein M is a sodium or lithium cation and the value of $a$, $b$ and $c$ is such that either $a<6$; $b>0$; $c>0$; and $b+c<2$; $\pm(a+b+c-6)<2$; or $a<6$; $b=0\pm c<2$; and $\pm(a+c-6)<2$, and a cation exchange capacity of about 50 to 120 meq./100 g. and a Bingham Yield Value of from about 40 to 250 dynes/cm.² as a 2% dispersion in tap water with (2) 3 to 25%, by weight of silicate, of one or more peptisers and (3) salts containing from 0.02 to 0.8 milliequivalent per gram of the silicate of one or more cations for which the ratio $Z/r^2$ is greater than $2.0\times10^{16}$, where Z is the valency and $r$ the radius of the cation, and mixing the compositions with water.

References Cited

UNITED STATES PATENTS

| | | | |
|---|---|---|---|
| 3,148,970 | 9/1964 | Smith et al. | 252—317 X |
| 2,133,759 | 10/1938 | Vail et al. | 252—317 X |
| 2,440,601 | 4/1948 | Dickerman | 252—313 X |
| 2,905,643 | 9/1959 | Billue et al. | 252—313 |

OTHER REFERENCES

Ries: "Clays—Their Occurrence, Properties, And Uses," 2d ed., pp. 516, 517; published 1908, John Wiley and Sons, New York, N.Y.

RICHARD D. LOVERING, Primary Examiner

U.S. Cl. X.R.

252—317; 260—29.6 S, 41 A